Figure 6:
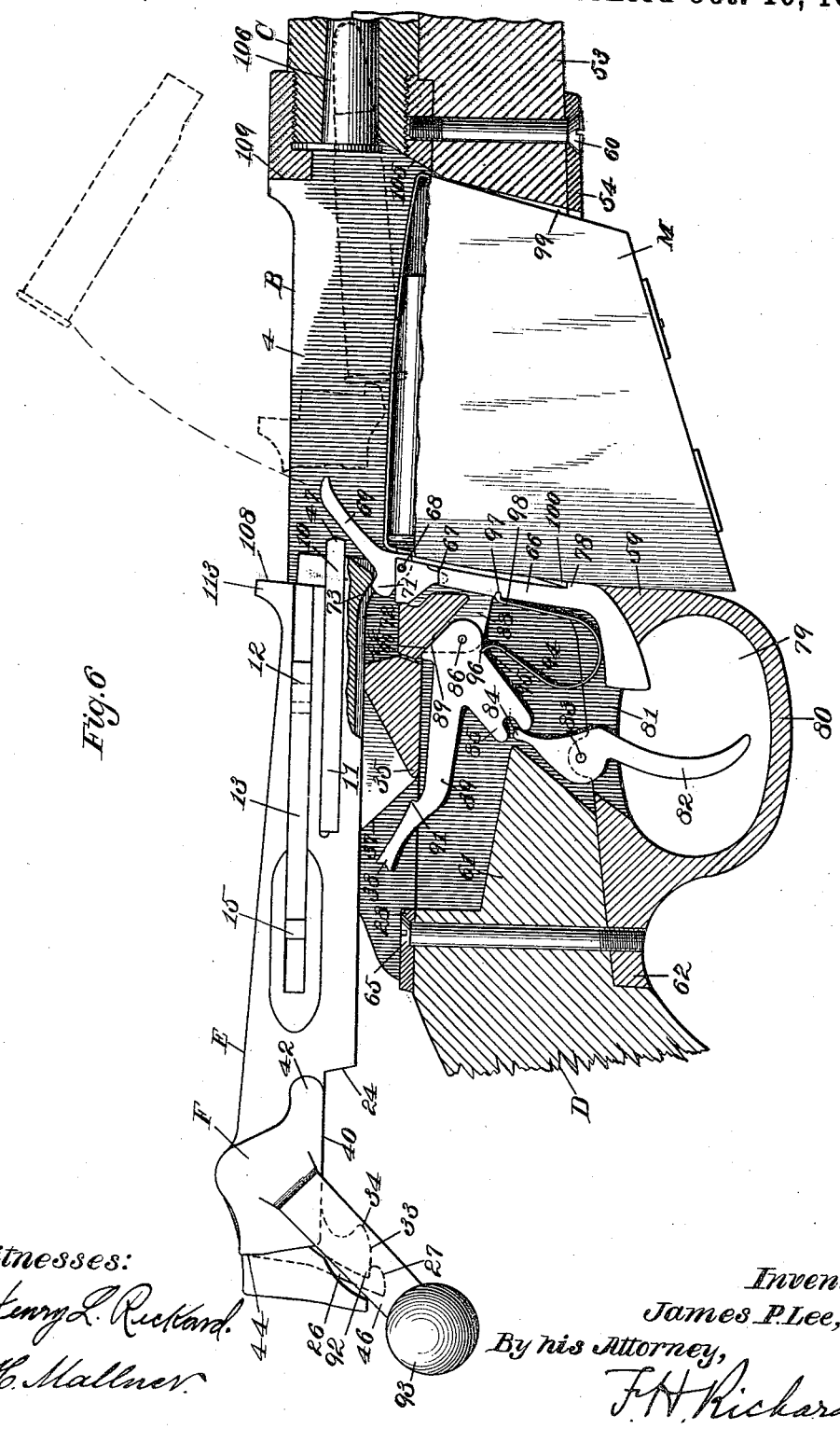

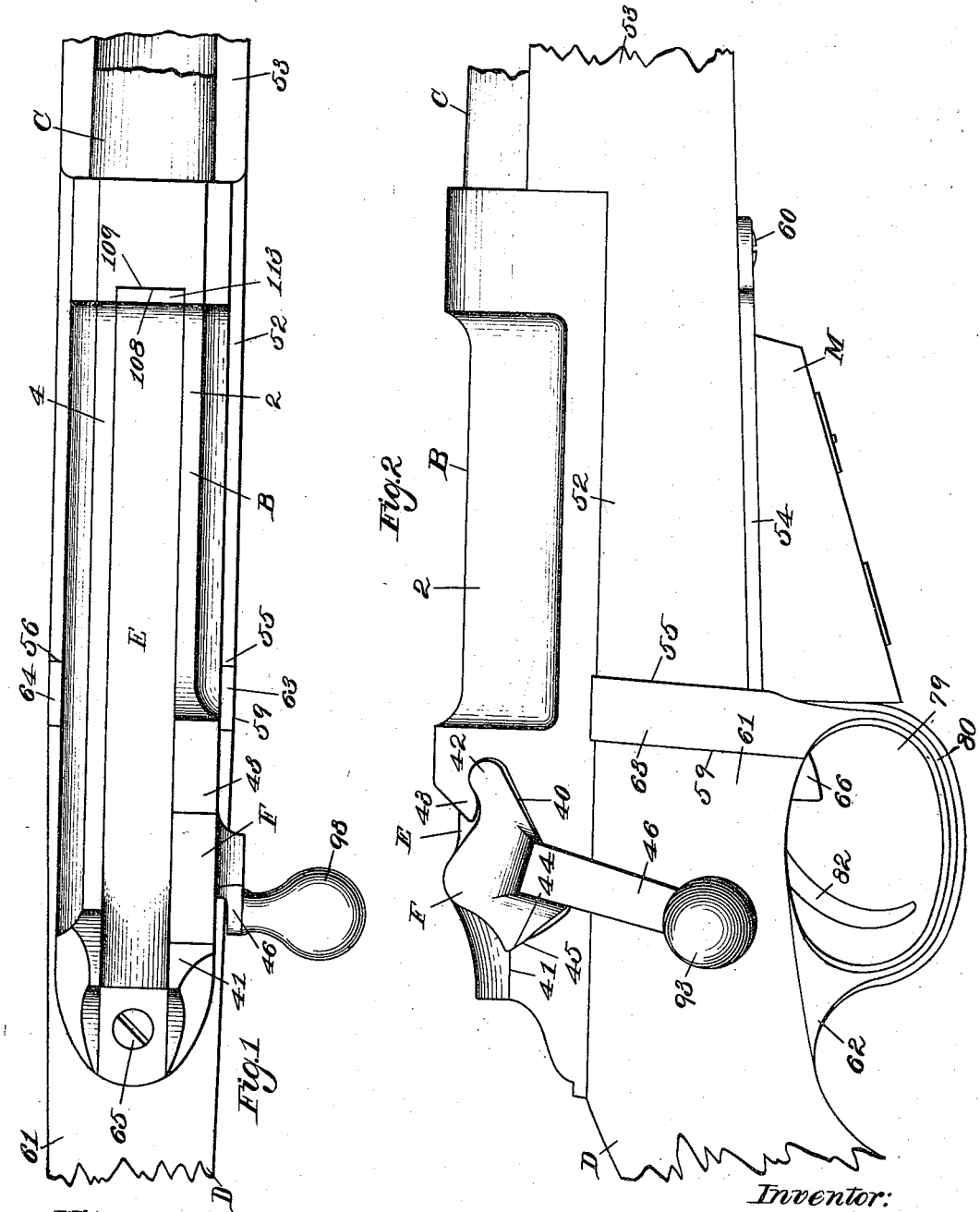

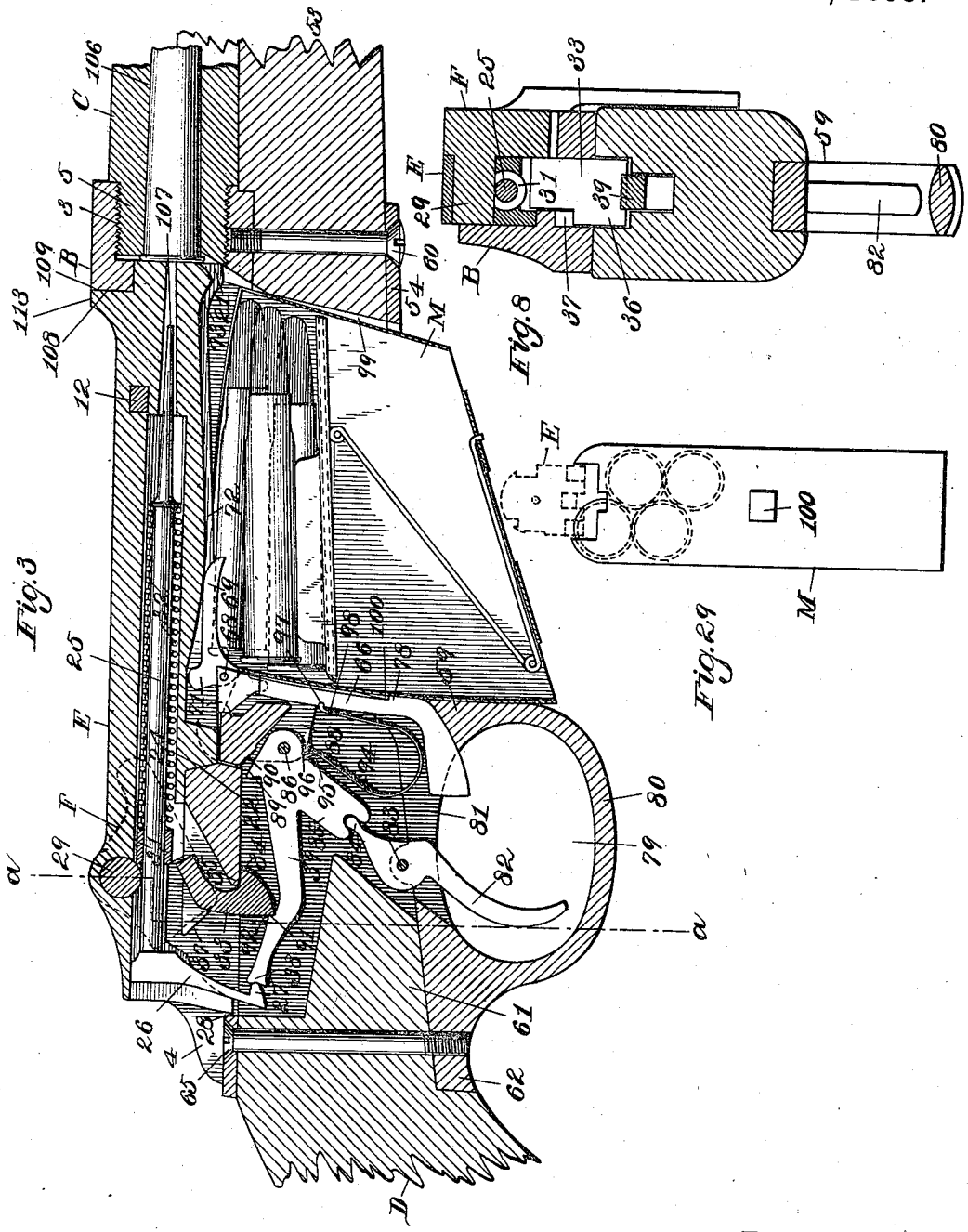

(No Model.) 12 Sheets—Sheet 3.
J. P. LEE.
STRAIGHT PULL BOLT GUN.
No. 506,319. Patented Oct. 10, 1893.
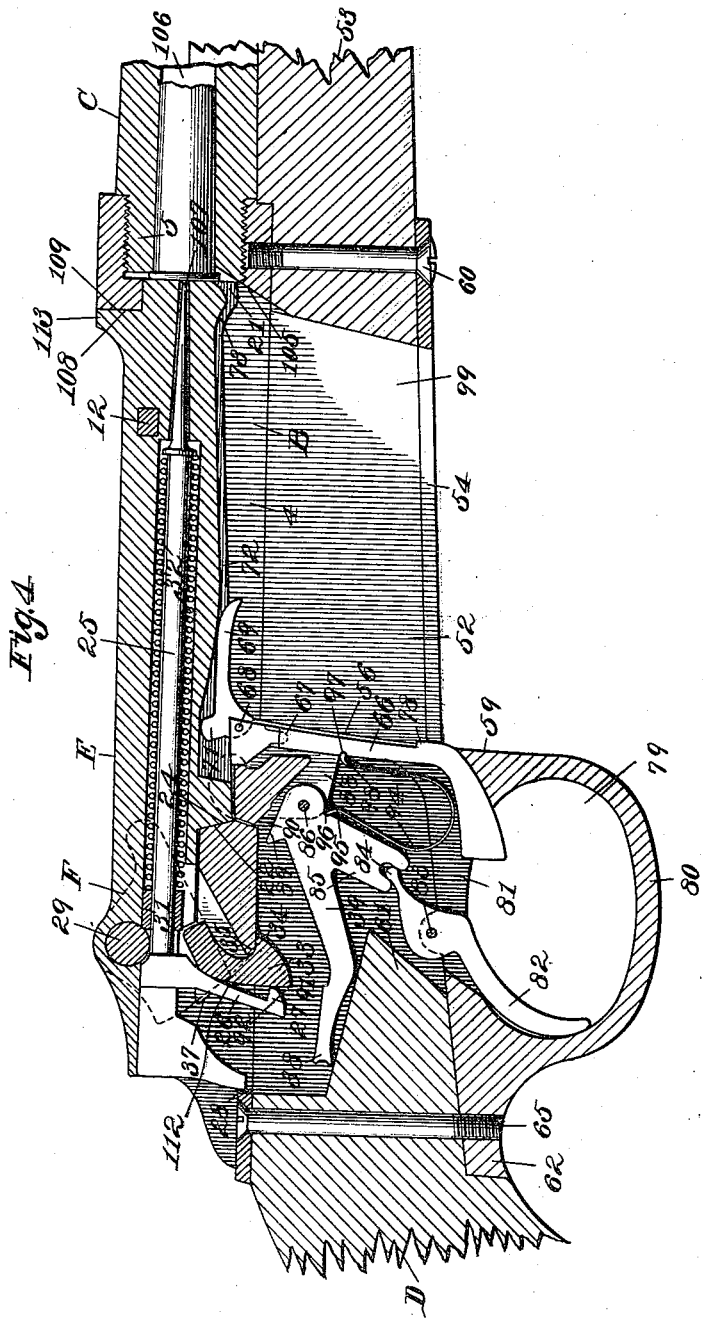
Witnesses:
Henry L. Reckard.
H. Mallner.
Inventor:
James P. Lee,
By his Attorney,
F. H. Richards (No Model.)
J. P. LEE.
STRAIGHT PULL BOLT GUN.
No. 506,319.
12 Sheets—Sheet 4.
Patented Oct. 10, 1893.
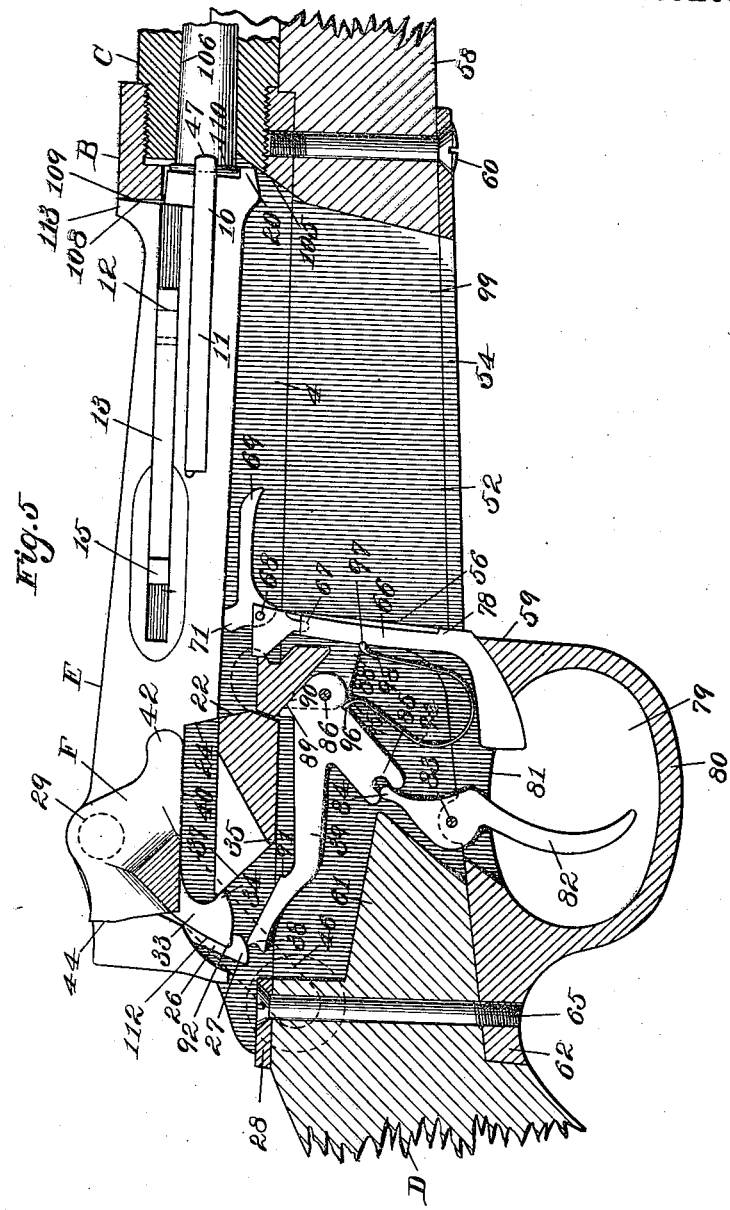
Witnesses:
Henry L. Reckard.
H. Mallner
Inventor:
James P. Lee,
By his Attorney,
F. H. Richards (No Model.)  
12 Sheets—Sheet 5.

J. P. LEE.
STRAIGHT PULL BOLT GUN.

No. 506,319.  
Patented Oct. 10, 1893.

Witnesses:  
Henry L. Reckard.  
H. Mallner.

Inventor:  
James P. Lee,  
By his Attorney,  
F. H. Richards (No Model.)
J. P. LEE.
STRAIGHT PULL BOLT GUN.
No. 506,319.
12 Sheets—Sheet 6.
Patented Oct. 10, 1893.
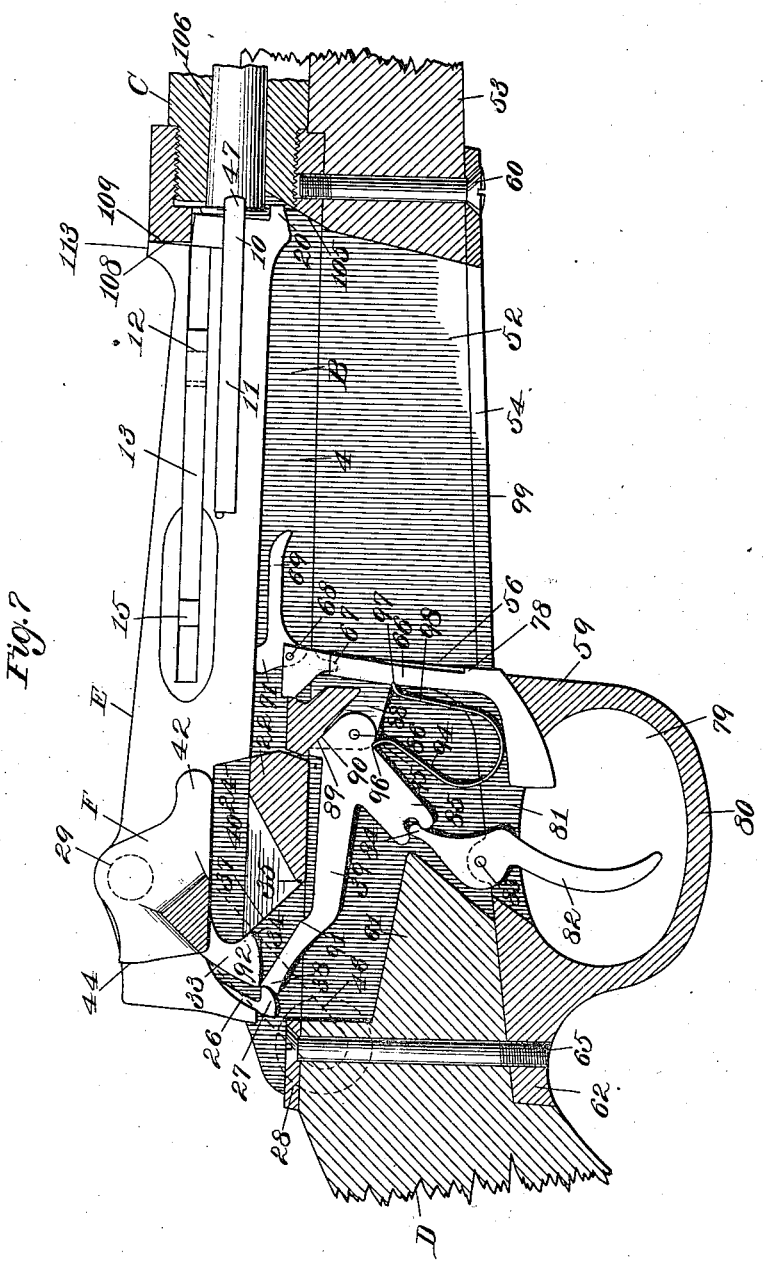
Witnesses:
Henry L. Rickard
H. Mallner
Inventor:
James P. Lee,
By his Attorney,
F. H. Richards

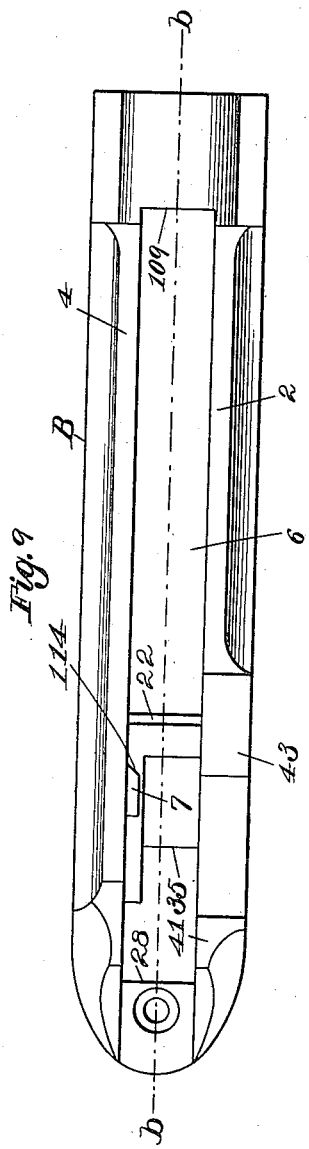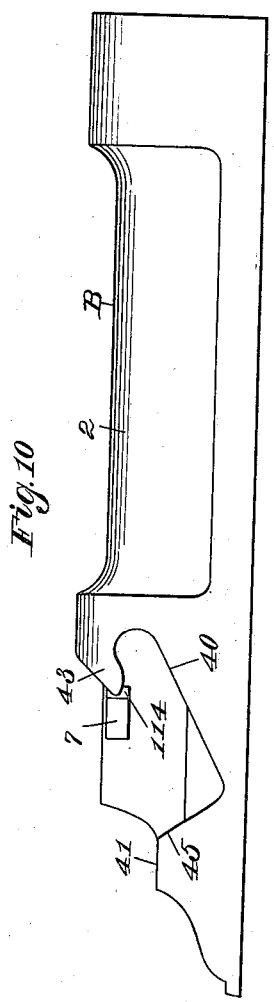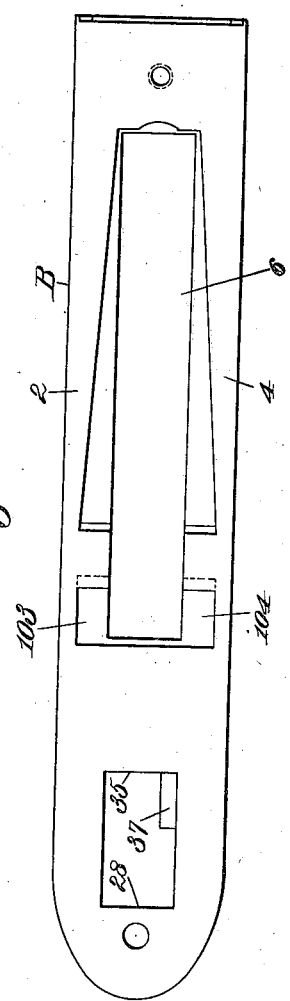

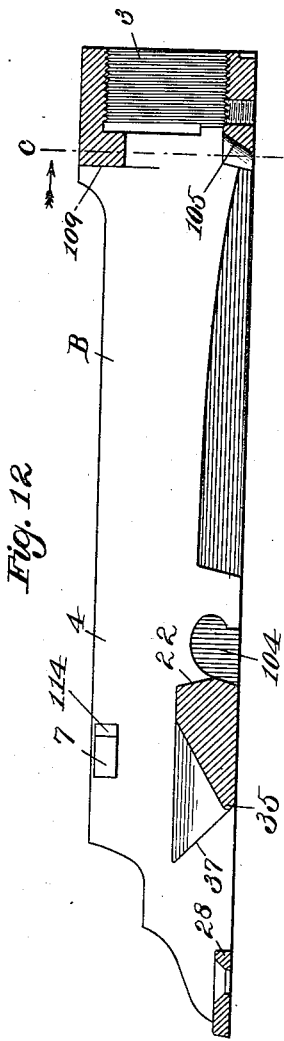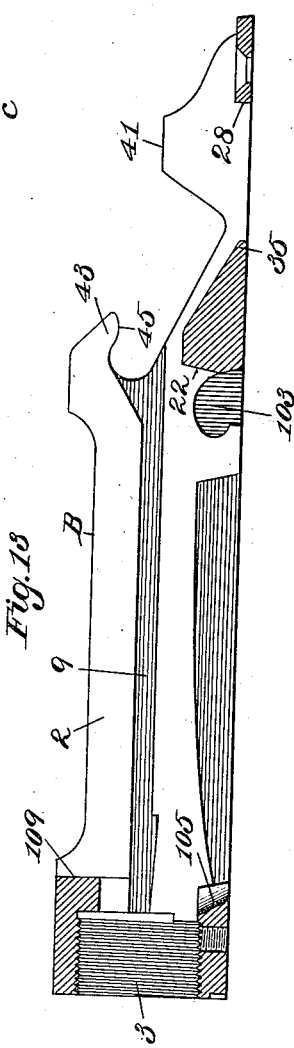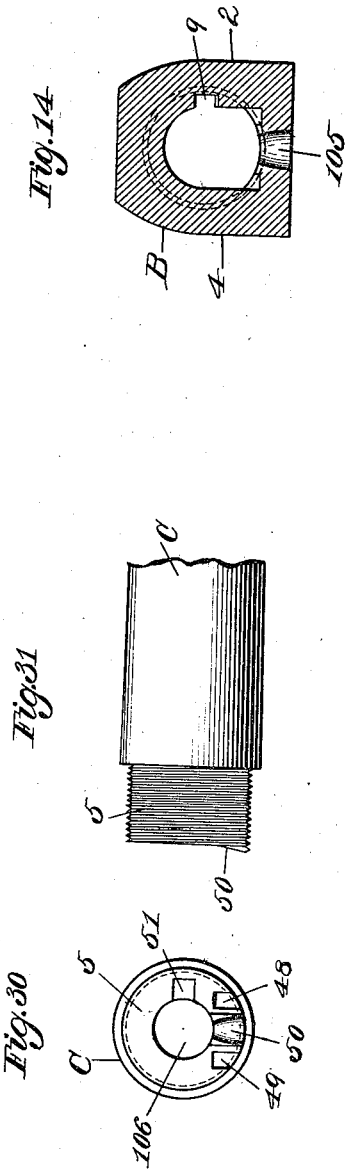

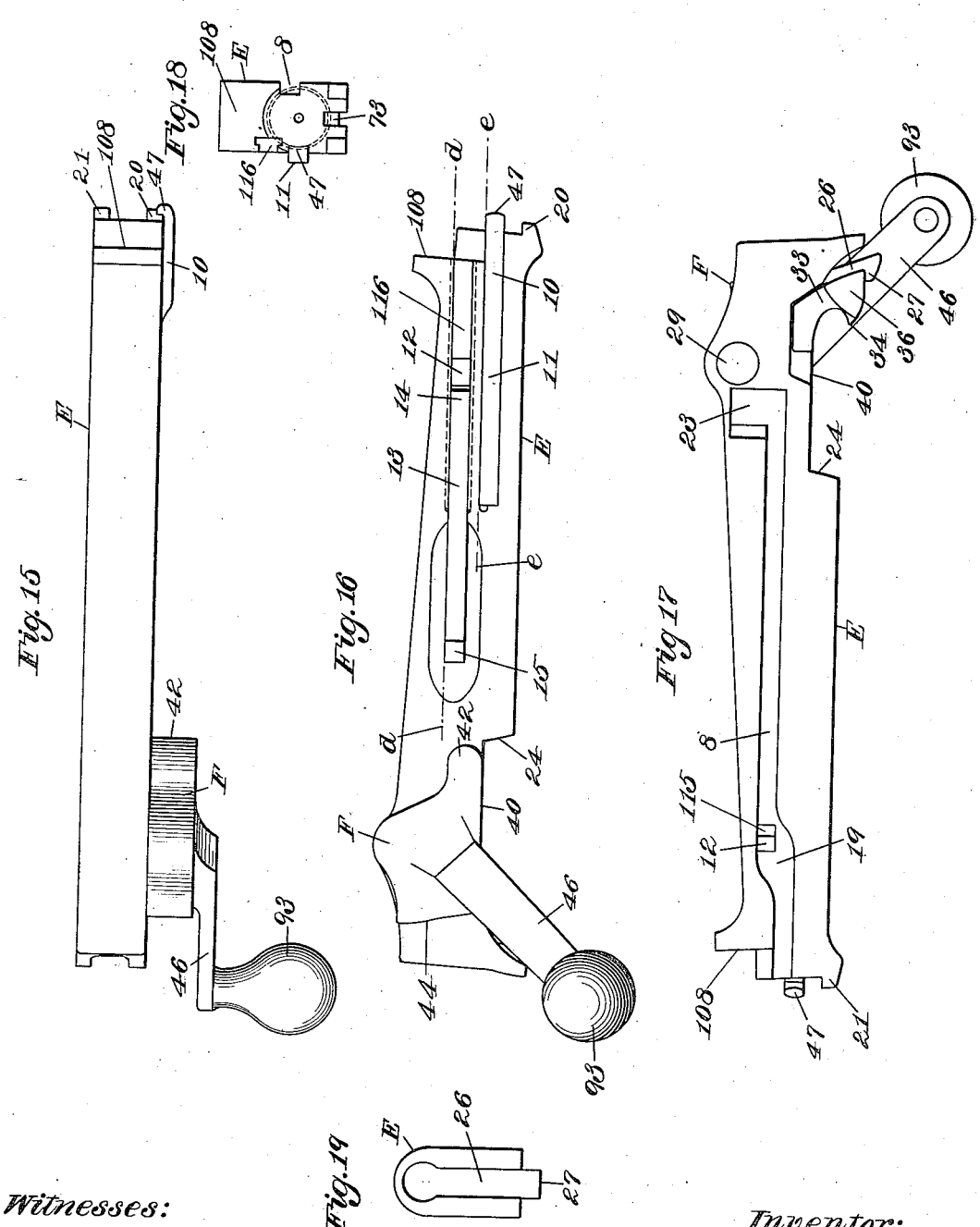

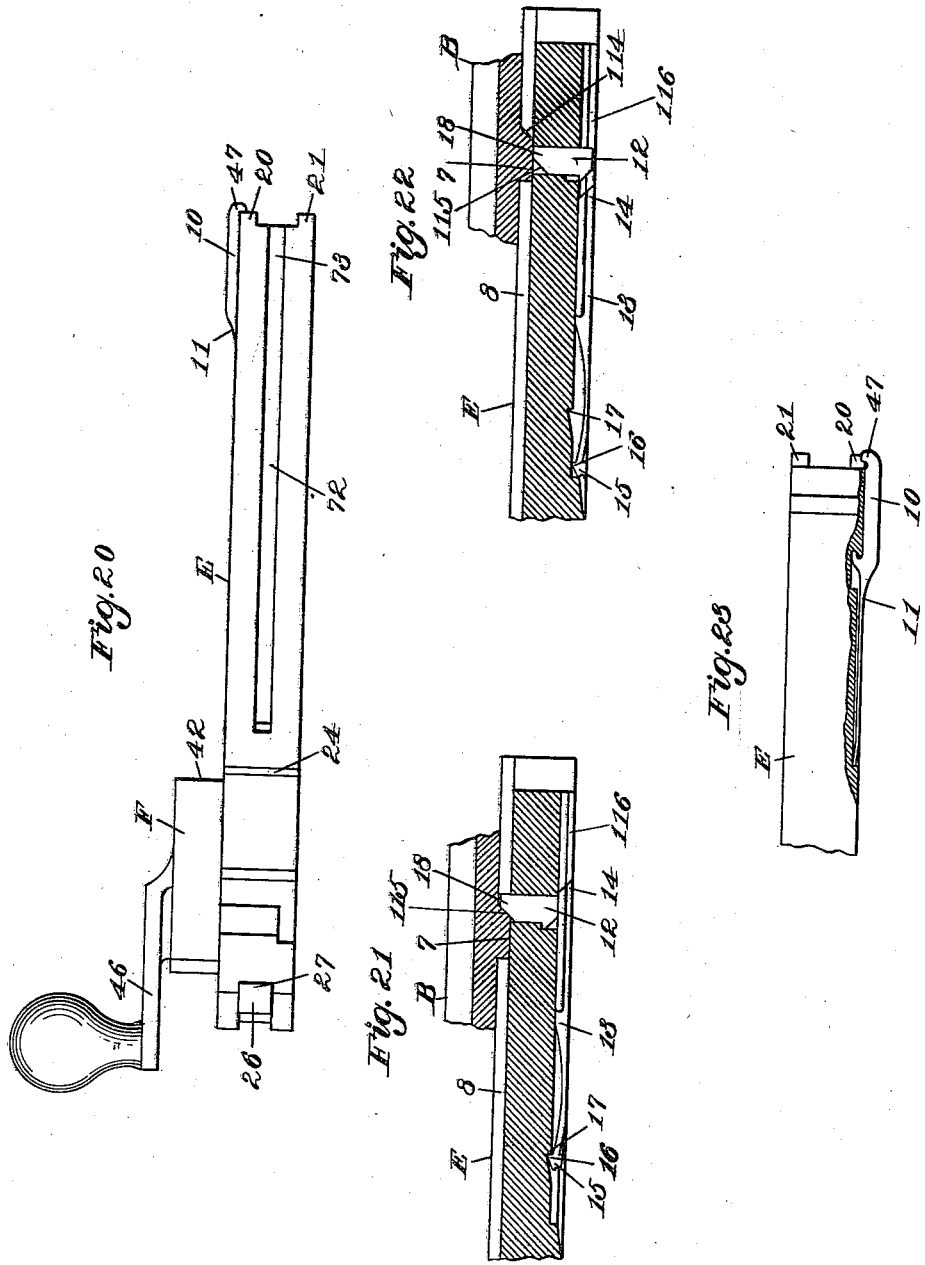

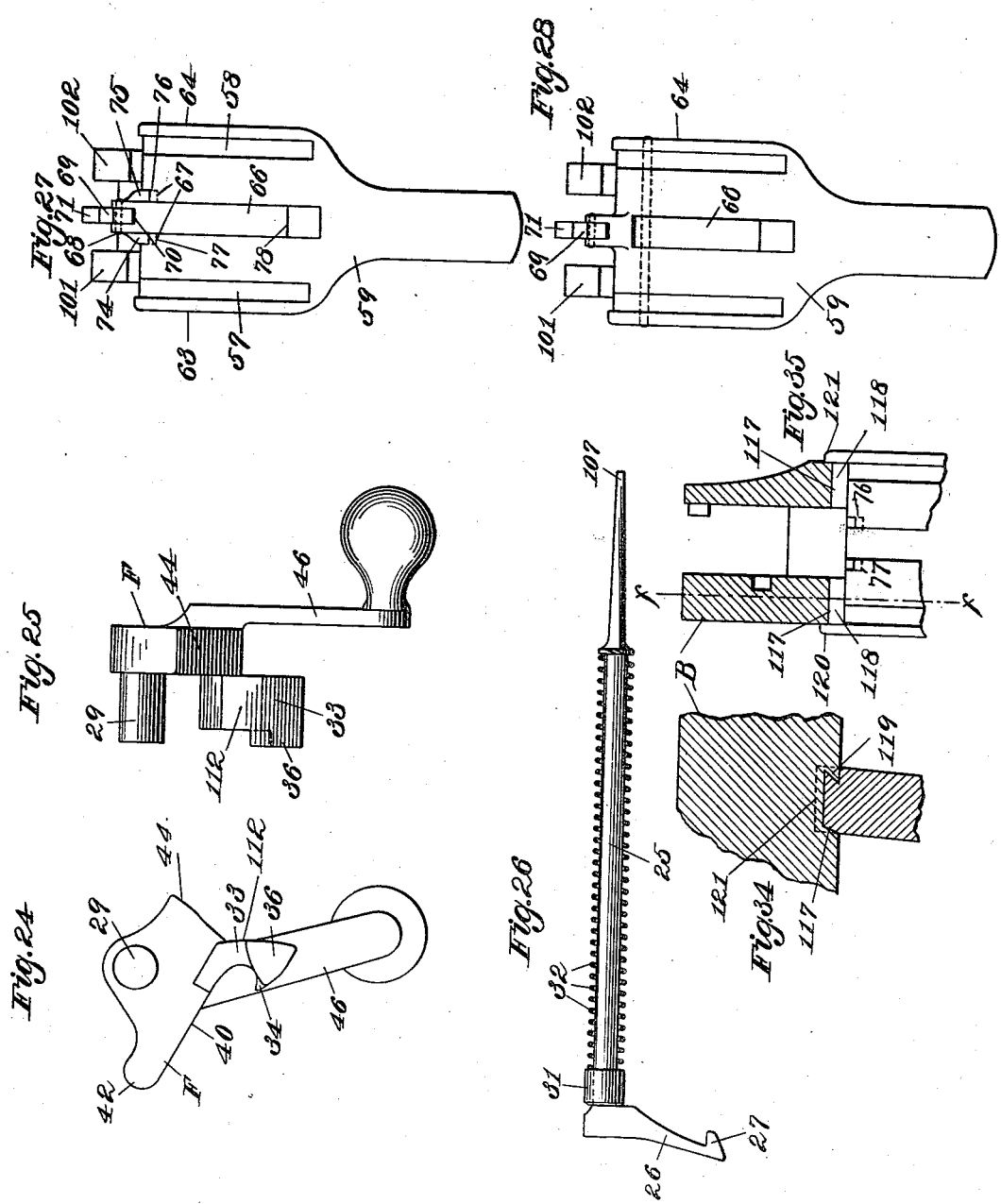

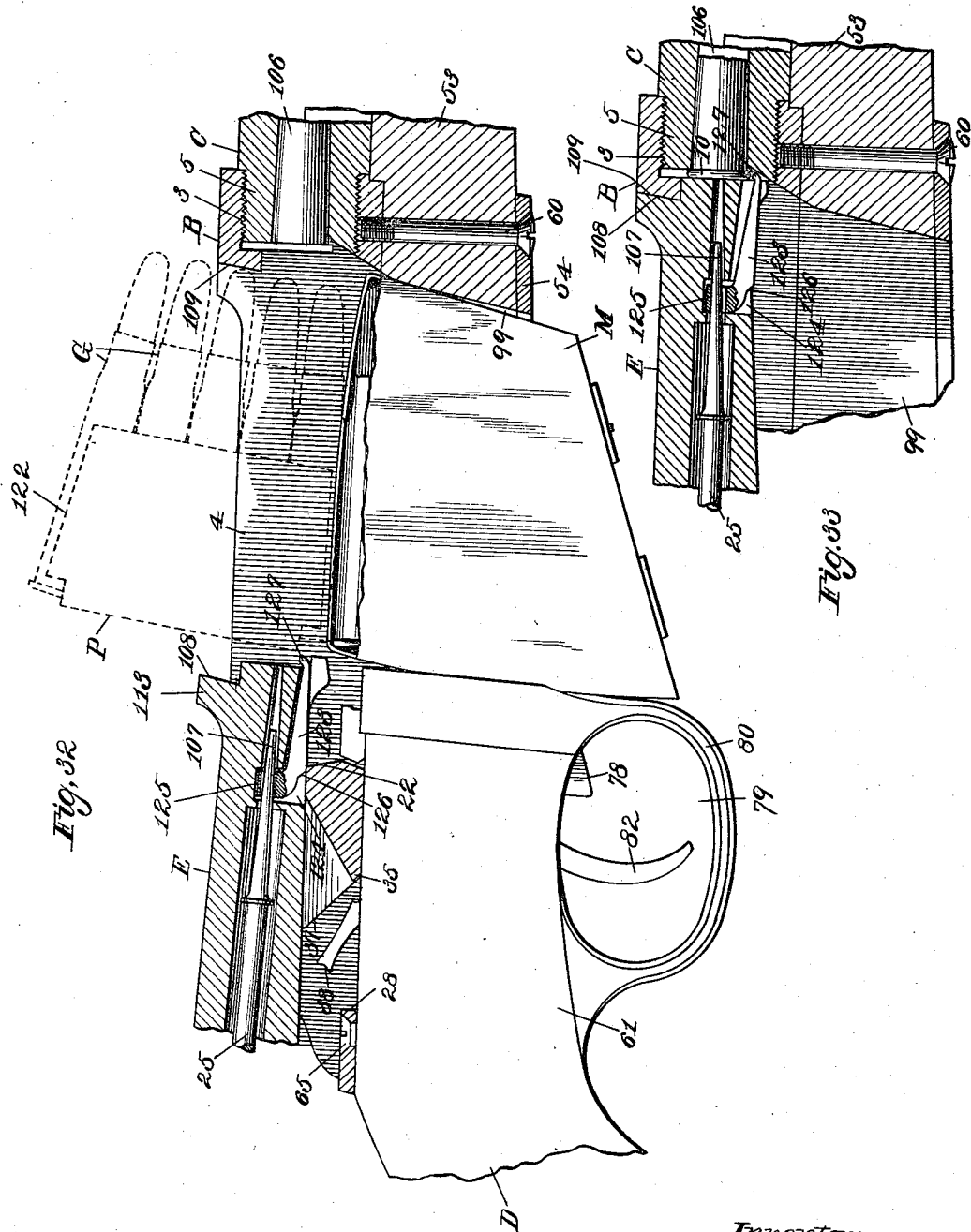

UNITED STATES PATENT OFFICE.

JAMES P. LEE, OF ILION, NEW YORK.

STRAIGHT-PULL BOLT-GUN.

SPECIFICATION forming part of Letters Patent No. 506,319, dated October 10, 1893.

Application filed August 19, 1892. Serial No. 443,481. (No model.)

*To all whom it may concern:*

Be it known that I, JAMES P. LEE, a citizen of the United States, and a resident of Ilion, in the county of Herkimer and State of New York, have invented certain new and useful Improvements in Bolt-Guns, of which the following is a specification.

This invention relates to that class of breech-loading fire-arms generally known as "bolt-guns."

The object of my invention is to provide an improved mechanism for breech-loading guns, whereby the sliding bolt may be unlocked, actuated and locked without imparting thereto rotary movements on its longitudinal axis; and also to provide effective means for locking and unlocking the bolt, for withdrawing the cartridge from the chamber of the gun-barrel, for preventing the firing of the cartridge prior to the complete closure and locking of the bolt, and for locking the bolt against retraction before this is entirely closed, whereby the gun will be rapid, effective and safe in action.

In the drawings accompanying and forming a part of this specification, Figure 1 is a plan view of a bolt-gun embodying my present invention. Fig. 2 is a right-hand side elevation of the gun. Fig. 3 is a vertical longitudinal section of the mechanism of the gun, showing the parts in the position when the gun is closed ready for firing. Fig. 4 is a sectional view similar to Fig. 3, showing the trigger drawn back and the firing-pin thrown forward. Fig. 5 is a sectional view similar to Figs. 3 and 4, showing the bolt-actuator thrown upward to the point of disengaging the bolt-abutment from the receiver-abutment, ready for the withdrawal of the bolt. Fig. 6 is a sectional view similar to Figs. 3, 4 and 5, showing the bolt withdrawn its full stroke, and illustrating also the throwing out of the empty cartridge. Fig. 7 is a sectional view similar to Figs. 3, 4, 5 and 6, showing the bolt returned to its forward position, ready for the locking movement of the bolt-actuator, and showing this actuator disengaged from the catch of the firing-pin arm. Fig. 8 is a cross-sectional view, in line $a\,a$, Fig. 3. Fig. 9 is a plan view of the receiver. Fig. 10 is a right-hand side elevation of the receiver. Fig. 11 is an inverted plan view of the receiver. Fig. 12 is a sectional view of the receiver, in line $b\,b$, Fig. 9, showing the portion above said line. Fig. 13 is a horizontal section of the receiver, showing the portion below said line $b\,b$ in Fig. 9. Fig. 14 is a cross section of the receiver, as seen from the left of line $c\,c$, Fig. 12; these three figures being for the purpose of illustrating the internal construction of the receiver and showing the several features thereof which co-act with the bolt mechanism. Fig. 15 is a plan view of the bolt and its accessory devices carried thereby. Fig. 16 is a right-hand elevation of the bolt mechanism, assembled as in Fig. 15. Fig. 17 is a left-hand elevation of the bolt mechanism. Fig. 18 is a view of the front end of the bolt. Fig. 19 is a view of the rear end of the bolt. Fig. 20 is an inverted plan view of the bolt mechanism. Fig. 21 is a longitudinal section of a portion of the bolt on line $d\,d$, Fig. 16. Fig. 22 is a view similar to Fig. 21, but showing the parts in a different position. Fig. 23 is a plan view of a portion of the bolt, partially broken away to illustrate the construction of certain details lying below the line $e\,e$ of Fig. 16. Fig. 24 is a left-hand side view of the bolt-actuator. Fig. 25 is a rear elevation of said actuator when in the position shown in Fig. 2. Fig. 26 is a side elevation of the firing-pin, with the main-spring and its abutment-sleeve carried thereon, the spring being shown in section. Fig. 27 is a front view of the guard-block, showing the magazine-catch and the ejector in place thereon, the ejector being, in this instance, carried by the upper end of the magazine-catch. Fig. 28 is a view similar to Fig. 27, showing the ejector carried by the guard-block, and the magazine-catch correspondingly modified in form. Fig. 29 is a rear view of the magazine, the relative position of the bolt being shown in dotted lines. Fig. 30 is a view of the rear end of the barrel. Fig. 31 is a side view of the rearward part of the barrel. Fig. 32 is a side elevation, partly in section, of the gun, showing a modification of the ejector, and illustrating the method of supplying the magazine from above. Fig. 33 is a view similar to a portion of Fig. 32, for further illustrating the modified form of the ejector. Fig. 34 is a sectional view of portions of the receiver and guard-block, the view being taken in line $ff$ of Fig. 35, and is illustrative of a modified form of the guard-block-retaining device. Fig. 35 shows a portion of the guard-block in front view, the receiver in cross section, and is further illustrative of said modification.

Similar characters designate like parts in all the figures.

The receiver, designated in a general way by B, is adapted to carry a sliding bolt, and has a recoil-abutment for sustaining the bolt when this is closed, against retraction. In its preferred form herein shown, the receiver, or gun-frame, consists of an open frame having the two side walls 2 and 4, joined at their front and rearward ends and constructed to carry the barrel C and for attachment to the stock, D, of the gun; and to receive within it the bolt mechanism. At its front end, the receiver has the bore 3, Figs. 3, 12, 13 and 14, for receiving the threaded end, 5, of the barrel C. A mortise, 6, Figs. 9 and 11, is formed for receiving the upper end of the magazine M (Figs. 3 and 6) through which to load the magazine, and also to load the gun when using this as a single-loader; the gun may be used as a single-loader at any time when the magazine is emptied of cartridges. Or, a cut-off may be used, as shown, for instance, in my United States Patent No. 221,328, granted to me November 4, 1879; which cut-off, being thrown into working position, holds the supply of cartridges down in the magazine.

On the inner side of the left-hand wall, 4, of the receiver is formed a projection, or abutment, 7, which fits into the groove, 8, (see Figs. 9 and 21) in the left-hand side of the bolt E, for guiding this in its course during the rearward and forward movement thereof. Said projection 7 is also a detent-catch for limiting the relative sliding movement of the bolt, by engaging a corresponding detent-pin on the bolt.

On the inner side of the right-hand wall, 2, of the receiver B is formed a groove, 9, in which runs the projecting forward part, 10, of the extractor 11, Figs. 13 and 15, which projecting portion of the extractor thereby acts as a guide co-operating with the aforesaid receiver-projection 7, or detent-stop, for limiting the movement of the bolt.

For preventing, during the ordinary operation of the gun, the retraction of the bolt beyond its normal rearward working position shown in Fig. 6, I provide said bolt with the transverse detent-pin 12, shown best in Figs. 16, 17, 21 and 22. This bolt is thrown outward, toward the left-hand in Fig. 1, by means of the detent-pin-actuator slide 13, which is shown let-in on the right-hand side of the bolt, and is shown beveled on the inner side of its forward end at 14 to throw said detent-pin outward on the forward movement of said slide 13, which slide has formed therein a spring-catch, 15, whereby to operate the same by the finger of the gunner. The rearward portion of said detent-pin-actuating slide is of the nature of a spring, and has on the inner side thereof a catch, 16, engaging a corresponding catch, or notch, 17, formed in the bolt for limiting the forward movement of said slide to the position thereof shown in Fig. 21. The rearward side of the left-hand end, 18, of said detent-pin is formed inclined as shown in Figs. 21 and 22; and the forward side of the aforesaid receiver-projection 7 is formed correspondingly-inclined, so that when said detent-pin-actuating slide is withdrawn, as shown in Fig. 22, on the withdrawal of said bolt, said projection, striking against the inclined point of said detent-pin, will drive the same toward the right-hand, thus allowing the pin to clear said projection and permitting the bolt to be entirely withdrawn from the receiver. The bolt having been slipped into the receiver far enough to carry the detent-pin forward of said projection 7, said pin should then be thrown toward the left-hand into its working position; this may be done by simply pushing forward the slide 13 from its position in Fig. 21 to that in Fig. 22.

The groove 8, formed in the left-hand side of the bolt, turns downwardly at the point 19 near the forward end of the bolt, and then runs forwardly parallel with the bolt, for the purpose of permitting the forward end of the bolt to rise just before it is withdrawn from the receiver, to allow the projections 20 and 21 of the bolt to pass over the receiver-abutment 22; this feature, of course, is operative only when the bolt is about to be fully withdrawn from the receiver. At the rearward end of said bolt-groove 8, this is broadened to form the upwardly-extending notch 23, for permitting the lowering of the bolt when this is in its forwardmost position, to bring the bolt-abutment 24 forward of, and into engagement with, the aforesaid receiver-abutment 22.

The bolt E is bored longitudinally thereof to receive the firing-pin 25, and at the rearward end thereof is downwardly slotted for the depending arm 26 of said firing-pin, which arm has on the forward side of its lower end a catch, 27, for a purpose hereinafter more fully set forth. On the lowering of the bolt, (by a movement transversely of the axis thereof,) into engagement with the receiver abutment and to the firing position of the gun shown in Figs. 2 and 3, the arm 26 of the firing-pin extends below the safety abutment 28 of the receiver, (also designated the bolt-locker-engaging abutment,) so as to prevent the blowing-out of the rearward part of the firing-pin should said pin by any means become broken in action,—such accidents sometimes happening by the perforation of a cap on the cartridge. Near its rearward end, immediately above and partially intersecting the bore for the firing-pin, the bolt is transversely bored to receive the journal 29 of the bolt-actuator, (which is designated in a general way by F,) which journal stands, when the parts are assembled, close to the upper side of the rod 25 of the firing-pin, said actuator-journal forming the abutment for the supporting sleeve 31 of the firing-spring 32.

The bolt-actuator F, also designated as the "bolt-locker," is shiftable from one position to another relatively to the bolt, and has several functions; among the principal of these is the lifting and lowering of the rearward end of the bolt when this is to be moved back and after the same has been moved forward, and to furnish an additional lock for the bolt against rearward movement before this is fully lowered into its closed position ready for firing. Another function of the actuator F, besides holding the bolt E down into its closed position, is to prevent the full forward movement of the firing-pin until after the bolt has been carried down into a safe locked position. For these purposes the actuator, or bolt-locker, F is furnished with the depending arm 33 having on the forward side thereof the hook 34, which on the closing of said actuator, or bolt-locker (as shown in Figs. 2, 3 and 4) engages under the lock-engaging catch 35 of the receiver, directly underneath the journal 29 of the bolt-locker. The extreme point of the hook 34 is shown beveled off, or slightly relieved, to form a cam for powerfully drawing down the bolt transversely thereof into its full-closed position during the latter part of the closing movement of the bolt-actuator. At the left-hand of the lower end of said actuator arm 33, is a projection, 36, the forward part of which coincides with the end of the aforesaid hook 34, and which passes close underneath the inclined cam-face 37 of the receiver during the entire closing movement of the bolt-actuator. Said projecting arm 36 serves in connection with the aforesaid cam-face 37 to forcibly draw down the actuator and bolt to their closed position on the turning of the actuator from its position in Fig. 7 to its position in Figs. 1 and 3.

The rearward side 112 of the depending actuator-arm 33 serves, on the retractive movement of the bolt-actuator, to draw back the firing-pin from the position shown in Fig. 4 to that shown in Fig. 5; on the extreme retraction of the actuator, said arm passes over and engages upon the aforesaid actuator-locker-catch 27 of the firing-pin-arm, so as to lock the actuator in its retracted position shown in Fig. 5. Said several parts being thus positioned and locked together, may then be drawn back as one member of the gun mechanism, as illustrated in Fig. 6, and afterward pushed forward to the position shown in Fig. 7, at which time the firing-pin-arm 26 engages the rearward end 38 of the sear 39, and is thereby held retracted during the remaining forward movement of the bolt mechanism to the position thereof shown in Fig. 3. This latter forward movement carries the bolt-actuator arm 33 forward of said firing-pin catch 27, and thus releases the actuator, which may now be turned forward to close the bolt.

Just previous to the firing-pin-arm 26 coming into engagement as hereinbefore described with the rearward end 38 of the sear 39, the guide-face 40 of the actuator comes over the lower actuator-guide 41 of the receiver, and the upper side of the lever-arm 42 of the actuator passes under the receiver-arm, or upper actuator-guide, 43, thereby restraining the actuator from any forward shifting movement until the actuator shall have been unlocked and the bolt shall reach its extreme forward position shown in Fig. 7. On the bolt reaching the latter position, the abutment-face 44 of the actuator passes forward of the actuator-abutment 45 of the receiver, (Fig. 1,) so that on the turning forward of the actuator by a downward and forward thrust on the handle-arm 46 thereof, the actuator, by means of the afore-mentioned cam 37, (and also, during a portion of the closing movement, through the forwardly-projecting actuator-arm 42,) draws down the bolt from its position in Fig. 7 to its fully-closed position in Figs. 1 and 3. At this time, the bolt of the gun, it will be observed, is locked in place not only by its own recoil-abutments but also by the engagement of the actuator with the bolt and with the receiver, thus furnishing a double security against any retraction of the bolt, by accident or otherwise, until the actuator shall again be open.

The forward end of the bolt E has at its upper side a face, 108, bearing against the corresponding face 109 of the receiver. On the lifting, or transverse, movement of the rearward end of the bolt, said face 108 acts against the receiver-face 109 as a fulcrum upon which the bolt as a lever turns or swings, for forcibly withdrawing the cartridge for a short distance, by means of the extractor-hook 47 engaging the rim 110 of the cartridge, (Fig. 5.) The bolt, therefore, constitutes not only a sliding bolt for the closing of the gun, and for pushing forward the cartridges thereinto, but also constitutes a powerful lever for starting the cartridge-shell from its seat within the gun-chamber. Said cartridge-starting function of the bolt being effected by the same movement which lifts the recoil-abutment 24 clear of the corresponding receiver-abutment 22, it is evident that the same operation of the bolt thus performs two of the more important functions of the mechanism by a single means, and adds to the simplicity and efficiency, and the corresponding value, of the mechanism.

The projections 20—21, at the forward end and lower part of the bolt, serve to support the cartridge-head from falling during the retraction of the cartridge by the engagement of the retractor-hook 47 with the rim thereof. See Fig. 5. Said projections, when the bolt is locked in its forward position, enter two small recesses, 48 and 49, formed in the rearward end of the barrel. These projections 20, 21, not only act to support the cartridge during retraction, but are in position to, and will alternately engage the rim of successive cartridges fed from the magazine into alignment with the sliding-bolt, and carry said cartridges forward to the gun-barrel as shown in dotted lines, Fig. 6 of the drawings. The said projections being oppositely disposed at the periphery and lower forward end of the sliding-bolt, it will be seen that the said projections engage the cartridge near the outer edge of the rim without liability of contact with the discharging-cap thereof. On the barrel, between said recesses 48 and 49, is a projection having a concaved face, 50, suitably inclined for receiving the forward end of the cartridge when this is driven forward by the bolt, and thereby guiding said cartridge upward into the rear of the barrel. At the right-hand inner side of the barrel, a suitable notch, 51, is formed to receive the projecting forward end, or hook, 47, of the extractor.

In Figs. 1 and 2, a short portion of the rearward part 52 of the tip 53 of the gun-stock is shown. On the end of this tip is usually placed the escutcheon-plate 54, which forms a guide for the insertion of the magazine, and whose rearward ends, 55 and 56, fit into notches at 57 and 58, respectively, in the forward face of the guard-block 59. Through the forward end of said escutcheon passes a screw, 60, which extends through said tip 53 and screws into the forward end of the receiver, as shown in Fig. 3.

The breech-piece 61 of the stock is fitted to the under side of the receiver and between the receiver and the strap 62 of the guard-block; the forward end of the breech-piece being fitted within the side-walls, 63 and 64, of said block. The screw 65 passes through the rearward end of the receiver through the stock, and screws into the rearward end of said strap 62, as will be understood from comparison of the figures of drawings in which said parts are shown.

The guard-block is centrally mortised at the forward end thereof to receive the magazine-catch 66, which is pivoted at 67, and carries at its upper end, by a pivot, 68, the ejector-arm 69; which arm is set into the slot 70 formed in the upper end of said magazine-catch, and has an actuating-arm, 71, which reaches upward into the groove 72 formed in the under side of the bolt E. Said groove, at its forward end, is shaped at 73 to form a cam, which on the retraction of the bolt strikes said arm 71 of the ejector and throws this downward into the position shown in Fig. 6, thereby ejecting the shell upward through the mortise 6 of the receiver.

The magazine-catch 66 is pivotally-supported, or journaled, on two projections, 74 and 75, set in corresponding sockets, or pivot-bearings, 76 and 77, formed in the upper side of the guard-block, and is thereby securely retained in place when the gun is assembled. The catch-lever 66, designated in a general way as the magazine-catch aforesaid, has on the forward side thereof a catch, or hook, 78, for engaging with the magazine when this is inserted into its receiving-chamber. The lower end of said catch-lever 66 is extended downwardly and rearwardly to project a short distance within the space 79 within the trigger-guard 80, which guard joins at its front end the front portion of the guard-block, and at its rearward end joins the strap 62 thereof, the guard being generally and preferably made integral with the other portions of the guard-block.

The mortise 81 of the guard-block is extended backward into the strap 62 thereof to receive the trigger 82, which is pivoted at 83, and whose upper end 84 connects with the arm 85 of the sear 39, which is pivoted at 86 in ears, as 88, formed on the guard-block. The stop 89 on the sear limits the upward movement of the sear by striking against the face 90 of the guard-block.

The rearward end, 38, of the sear is shaped to engage the lower end, 27, of the firing-pin-arm 26 when this is moved forward and during the closing movement of the bolt. The sear also has a catch, 91, which normally engages the catch 92 at the lower end of the bolt-actuator arm 33, for retaining the actuator closed (after the closing of the bolt) until the trigger shall have been pulled. One purpose of this feature is to prevent accidental retraction of the bolt-actuator while the firing-pin-arm stands on the sear as in Fig. 3. In practice, however, said catch may not be exactly a so-called "dead catch," but may be slightly inclined, so that a vigorous pull upon the handle 93 of the actuator-lever will retract the bolt-actuator and thus permit the gun to be unloaded without first firing the cartridge. By this means the bolt mechanism may be operated without firing the cartridge. The sear is so proportioned that the forcible retraction of the actuator from the catch, or detent-notch, 91, of said sear does not disengage the sear from the firing-pin-arm. By means of this construction and organization of the mechanism, the gunner may hold back the firing-pin, when it is not desired to fire the loaded arm, by first forcibly drawing back for a little distance the bolt-actuator, and then pulling the trigger; the firing-pin being, in this case, stopped in its course by the striking of its arm 26 against the firing-pin stop 112, on the rearward side of the bolt-locker arm 33, as illustrated in Fig. 4.

For retracting the sear, the sear-spring 94 is inserted thereunder, having its end 95 working in a notch, 96, formed in the sear-arm 85, as shown. Said spring also is shown having its opposite end seated in a notch, 97, in the rearward side of the magazine-catch, so that the one spring actuates both the sear and the magazine-catch. The forward end, 98, of said spring is broadened so as to stand immediately under the flanges 88—88 in which the sear is pivoted, for the purpose of normally preventing any upward movement of the magazine-catch out of its bearing-sockets.

The magazine, designated in a general way by M, shown in the drawings is supposed to be the same magazine as shown and described in my application Serial No. 447,539, filed October 1, 1892. It will be understood, however, that the construction of the magazine is not a feature of my present invention, and that I may substitute for the form of magazine shown any other well-known form of cartridge-magazine.

When using the preferred form of magazine shown in the drawings, this is shaped to set within the chamber 99 of the stock-tip 53 and to enter immediately within the mortise 6 of the receiver, being held in place by the hereinbefore-described magazine-catch 78 engaging a catch, 100, formed on the rearward end of the magazine. To remove the magazine from the gun, it is only necessary to draw back the catch 66 and draw the magazine down out of said chamber. Of course, the magazine used should have therein, or in connection therewith, suitable cartridge-elevating means for bringing the cartridges up into position forward of the bolt, where this can engage the heads thereof for driving them forward into the chamber of the gun-barrel.

As a means for connecting the guard-block to the receiver, said block has formed thereon the hooks 101 and 102, which engage in corresponding under-cut notches, 103 and 104, formed in the receiver. The screw 65, by connecting the end of the guard-arm with the receiver, holds the guard-block in locking-engagement with the receiver.

The particular manner of constructing the guard-block for locking-engagement with the receiver may be varied from that shown in Figs. 12, 13 and 27. In Figs. 34 and 35, the recess, or space, 117, across the under side of the receiver B, is shown of the nature of a dovetail (see Fig. 34), the guard-block being provided with the tongues 118—118 for entering said spaces and engaging the catch 119 at the forward side thereof. With this construction of the guard-block-holding catches, the sides of the guard-block may be carried upward to form the flanges 120 and 121, (Fig. 35,) for entirely covering the ends of the dovetail cut in the receiver, as indicated by the dotted line at 121, Fig. 34.

The lower side of the guide-face 50 of the barrel coincides with the upper edge of the similar guide-face 105 of the receiver; so that said two guide-faces together form a guide-way for guiding the point of the cartridge and elevating the same, (during the first part of its forward movement.) Said inclined guide-way co-acts with the bolt of the gun when this strikes the head of the cartridge, to guide and elevate the point of the cartridge into position for entering the chamber of the gun.

The general operation of the fire-arm is as follows: The gun having been fired, and the bolt remaining closed as in Fig. 4, the gunner, seizing the handle 93 of the bolt-actuator, draws backward thereon to retract the bolt mechanism throughout its full stroke to the position shown in Fig. 6. The first movement of the actuator F is to turn itself and by means of its lifting-arm 46 lift the rearward end of the bolt from its position in Fig. 4 to its position in Fig. 5 with the recoil-abutment 24 of the bolt just clear of the recoil-abutment 22 of the receiver. This movement of said actuator carries the actuator-arm 33 backward against the firing-pin-arm 26, and retracts the firing-pin to its position shown in Fig. 5, engaging the catch 27 of said firing-pin-arm over the end of the actuator-arm, and thereby locking the actuator firmly in its retracted position. This position of the bolt mechanism having been reached, the further drawing back upon the actuator-handle 93 slides the bolt, while this stands in its inclined position, backward to its retracted position shown in Fig. 6. The first-described lifting movement of the bolt acts, as hereinbefore set forth, after the manner of a powerful lever, to forcibly withdraw the cartridge a short distance, but with correspondingly great force, from the gun-chamber 106; the cartridge-shell, having been thus started from its seat, is thereafter readily drawn back, so that this may readily be done by the direct pull upon the handle 93 of the bolt mechanism. Just previous to reaching its fully retracted position, the ejector-cam 73 on the under side of the bolt strikes the arm 71 of the ejector and forcibly throws this downward, and the ejector-arm 69 upward, thereby ejecting the shell upward through the mortise 6 of the receiver, as hereinbefore more fully set forth and as illustrated in connection with Fig. 6. The shell having been ejected and another cartridge brought up by the magazine to the position shown in Fig. 6, forward of the bolt, the operator then pushes forward the bolt by a steady pressure upon the actuator-lever 46. The first forward movement of the bolt drives the cartridge forward, with its point against the guide-way 105, which lifts the cartridge-point upward to the gun-chamber, so that during the remaining forward movement of the bolt the cartridge is slid into place in said chamber. The bolt having gone forward to the position shown in Fig. 7, the lower end of the firing-pin-arm 26 engages the sear and is thereby held retracted during the remaining forward movement of the bolt mechanism; at the same time, the forwardly-extending actuator-arm 42 reaches under the guide-arm 43 of the receiver, thereby preventing any forwardly-shifting movement of the bolt-actuator relatively to the bolt, until the bolt shall have gone forward to bring its recoil-abutment 24 forward of the receiver recoil-abutment 22; at the same time the guide-face 40 of the bolt-actuator, by riding on the guide-face 41 of the receiver, prevents the pressure upon the actuator (after the unhooking of the actuator-arm 33) from turning the actuator and thus prematurely tending to lower the bolt, which would cramp the parts and prevent their free action. This construction and organization of the parts insure the releasing of the actuator-arm from the firing-pin-catch prior to the beginning of the forward rotary movement of the actuator. The bolt mechanism having been drawn forward, as set forth, to the position shown in Fig. 7, with the actuator-abutment-face 44 forward of the corresponding receiver abutment-face 45, the continued pressure upon the actuator-handle now turns, or shifts, said actuator from the position shown in Fig. 7 to that shown in Fig. 3, thereby carrying down the bolt, (by means of the lever-arm 42 and of the safety-cam 37 hereinbefore described,) which draws down the actuator and bolt together and locks the same in their closed position. The gun now being loaded and locked ready for firing, the gunner has only to take aim, and, when ready to fire, pull the trigger; this, through the connections described, retracts the sear from its engagement with the firing-pin, which is then thrown forward by the main-spring 32 to strike with its point 107 the cap of the cartridge and thus fire the same. The gun having been fired, is then ready for a repetition of the loading operation, which is again performed as hereinbefore described.

That element of the bolt mechanism which I have designated as the "firing-pin" not only constitutes a pin for firing the cartridge, but the rearward portion thereof also serves as a spring-actuated bolt-actuator-locker. Considering said element only as an actuator-locker operating for the purpose specified, it consists, in the preferred form thereof herein shown, of the rod 25 provided with an arm, 26, and having a hook, or catch, 27, engaging the actuator for locking the same in its retracted position; the object of this arrangement being to temporarily and securely lock the actuator against any shifting movement relatively to the bolt during the operation of withdrawing and sliding forward the bolt mechanism. By this means the handle of the shiftable actuator F is made to serve as a handle for operating the bolt as set forth, and operates both parts by a single continuous stroke; also, the actuator is thereby prevented from having any premature forwardly-shifting movement relatively to the bolt.

In view of its function of serving as a lever for starting the cartridge, the sliding-bolt, in some of the claims, is designated as a "lever-bolt," it serving as a lever for the purpose specified. The projection, or arm, 113, hereinbefore more fully described, constitutes a fulcrum which bears against the fulcrum-seat or bearing at 109 for drawing back the cartridge-supporting face of the bolt and the extractor-hook adjacent thereto, during the transverse movement of the rearward end of the lever-bolt. The length of the aforesaid fulcrum-arm 113—i. e., the distance between the extractor and the effective fulcrum 108—is comparatively short relatively to the length of the bolt, and may be regulated in practice to correspond with the length of the bolt and the extent of the transverse movement of the rearward end thereof, in connection with the distance through which it may be required to draw the extractor-shell before this becomes so freed from engagement with the bore of the barrel as to be readily withdrawn by the direct pull of the bolt.

The element which I have designated by 39, and which, in the form thereof herein shown, constitutes the sear for operating the firing-pin, serves, independently of its connection with the firing of the cartridge, as a bolt-actuator-locker retractor, for detaching the actuator-locker-catch 27 from the bolt-actuator-arm 33 during the closing period of the forward movement of the bolt, after the actuator-lever 42 has come into engagement with the lever-bearing 43 on the receiver. By this means, as elsewhere herein set forth, the bolt-actuator F is unlocked from the bolt at the proper time for imparting thereto the transverse movement for engaging the same with the recoil-abutment, 22, of the receiver.

By the term "sliding bolt," as used herein, is meant the longitudinally-reciprocating bolt arranged rearwardly of the gun-barrel for opening and closing the same, said bolt being drawn back by a longitudinal movement thereof for opening the barrel and extracting the cartridge, and carried forward by a reverse longitudinal movement thereof to drive the cartridge into the barrel and close the bore thereof.

The detent-catch, 7, for holding the bolt mechanism in the gun, also serves as a guide for controlling the sliding movement of the bolt. The forward side, 114, of said detent-catch is inclined to form a cam-face for engaging the corresponding inclined face, 115, of the sliding detent-pin 12 for the purpose of driving back this pin from the position shown in Fig. 21 to that shown in Fig. 22 when, after releasing said detent-pin by drawing back the slide 13, the operator draws the bolt mechanism backward to remove the same from the gun. When it is required to remove the detent-holding slide 13, the operator has only to lift the spring 15 so that its catch 16 disengages from the bolt-catch 17, and thus allows the slide 13 to be slid forward in the groove 116 and removed from the bolt.

The lever, 42, of the oscillating bolt-actuator F acts in the nature of a cam, especially during the backward movement thereof for opening the bolt. The extent to which the lever, or arm, referred to conforms to the usual operation of a lever or of a cam, will, of course, depend upon the particular form and proportions of said parts; and those proportions may be varied within considerable limits without materially modifying the action of this element of the complete bolt mechanism.

By the term "transverse movement," as applied to the bolt of the gun, is meant that motion which, according to my present invention, said bolt has in a direction crosswise to the line of its longitudinal reciprocating movement, this latter movement being substantially in alignment with the bore of the gun.

The recoil-abutment 22 of the receiver being formed inclined substantially as shown, the bolt E, when this is closed transversely from the position shown in Fig. 7 to that shown in Fig. 3, is forced slightly forward with great power, for the purpose of driving the cartridge firmly into place in the bore of the gun. Said transverse closing movement of the bolt being effected by means of suitable mechanical appliances operating substantially as herein set forth, is readily accomplished by a slight forward pressure on the handle 93 of the bolt mechanism.

In Figs. 32 and 33 I have shown a modified arrangement of the cartridge-ejector, which in this case is carried by the bolt mechanism, so that when the bolt is in its rearward working position shown in Fig. 32, the magazine M may be loaded from above by means of a loading-packet, P, which may be of any of the well-known plans of these packets now used. As shown in Fig. 32 by dotted lines, the loading-packet consists of a suitable holder, as 122, (which may be of the so-called "Mannlicher" type,) and has five cartridges, G, also shown by dotted lines.

The ejector 123, shown in Figs. 32 and 33, is carried in a recess, 124, formed in the under side of the forward end of the sliding bolt E, the ejector being supported by its perforated hub, or eye, 125, upon the firing-pin 25, as will be understood by comparison of the drawings. On the retraction of the bolt to its rearward position shown in Fig. 32, the cam-face 126 of the ejector strikes the recoil-abutment 22, which suddenly and forcibly throws the ejector forwardly and upwardly from its position (relatively to the bolt) shown in Fig. 33 to its position shown in Fig. 32, the point, 127, of the ejector striking the shell of the cartridge and ejecting the same.

By supporting the bolt-locker, or bolt-actuator, on the bolt in the manner set forth, and extending the handle-arm thereof downwardly by the side of the stock of the gun, the handle is brought into a position which enables the soldier to operate the bolt mechanism without taking the gun from the shoulder, thus reducing by two the number of "movements" which would otherwise be required for operating the fire-arm. By means of my present invention, therefore, I accomplish an important object in simplifying the management of the piece, the entire operation of the breech-loading mechanism being effected by continuous strokes of the handle forwardly and backwardly alongside of the gun-stock.

One of the results accomplished by the moving forward of the bolt while this is in the inclined position described, is that the forward end of the bolt bears against the head of the cartridge only on the rim thereof, until after the cartridge has been so far forced home that it may be safely exploded, and until after the bolt has been moved transversely so far behind the recoil-abutment as to make it safe to explode the cartridge. By this means I overcome a danger inherent in some breech-loading guns, which danger arises from the protrusion of the cap beyond the plane of the cartridge-head; this defect in the ammunition, as is well known, is frequently met with.

According to my improved system of handling the cartridge, whereby the pressure is applied only to the rim of the cartridge-head until this is safely placed in firing position, I have avoided the accidental firing of the cartridge by the impinging of the bolt, during the closing thereof, upon a protruding cap.

Having now described my invention, I claim—

1. In a bolt-gun, the combination with the receiver adapted for carrying a sliding bolt and having a recoil-abutment in the path of movement of the bolt, of a non-rotatable bolt having an abutment adapted for engagement with the abutment of the receiver, said bolt being adapted to have, when in its forward position, transverse movements for bringing its abutment into and out of engagement with the recoil-abutment of the receiver, and a bolt-actuator journaled in said bolt and engaging the receiver and adapted for imparting the transverse movements to said bolt.

2. In a bolt-gun, the combination with a receiver constructed to carry a sliding bolt and to hold said bolt against rotation, and having a recoil-abutment for the bolt, of the non-rotatable bolt fitted to slide in the receiver longitudinally of the bore of the gun, and adapted to have, when in its forward position, tranverse movements from and into engagement with the recoil-abutment, and a bolt-actuator carried by the bolt and constructed to engage the receiver when the bolt is in its forward position, and to disengage itself from the receiver on the retractive sliding movement of the bolt, said actuator being adapted to be shifted relatively to the bolt for engaging and disengaging this with and from said recoil-abutment.

3. In a bolt-gun, the combination with the receiver adapted for carrying a sliding-bolt, and having a locker-arm engaging catch 35, of a bolt sliding in said receiver and capable of vertical transverse movement, and a bolt-locking-actuator journaled in said bolt and in movable engagement with the receiver and capable of oscillation for raising and lowering said bolt with relation to the receiver and having a locking-arm to engage the catch of the receiver to lock said bolt when in its lower closed position.

4. In a bolt-gun, the combination with the receiver adapted for carrying a sliding-bolt, of a non-rotatable-bolt sliding in said receiver and capable of movement transversely to its longitudinal axis, and a bolt-actuator journaled in said bolt and movably engaging said receiver and adapted for raising and lowering said bolt with relation to the receiver.

5. In a bolt-gun, the combination with the receiver adapted for carrying a sliding-bolt and having a recoil abutment and a bolt-locker-actuating-catch, of a bolt fitted to slide in said receiver and adapted to have, at one end thereof, transverse movement with relation to its longitudinal axis for engagement with and disengagement from the recoil-abutment of the receiver, and an oscillating bolt-actuator pivotally carried by said bolt and adapted for elevating and depressing said bolt and having a bolt-locking arm adapted for engagement with the locking-catch of the receiver when the bolt is closed.

6. In a bolt-gun, the combination with a receiver adapted to carry a sliding bolt and having a recoil-abutment and a lever-bearing, of a bolt fitted to slide in the receiver and adapted to have at one end thereof a transverse movement from and into engagement with the recoil-abutment, a firing-pin substantially as described carried by the bolt, and a bolt-actuating lever carried by the bolt and adapted when the bolt is in its forward position to engage said lever-bearing for opening the bolt, and having an arm engaging the firing-pin for retracting the same during the transverse opening movement of the bolt.

7. In a bolt-gun, the combination with a receiver adapted to carry a sliding bolt and having a recoil-abutment and a lever-bearing, of a bolt fitted to slide in the receiver and adapted to have at one end thereof a transverse movement from and into engagement with the recoil-abutment, an actuator-locker substantially as described carried by the bolt and having an actuator-engaging catch, and a bolt-actuator carried by the bolt and adapted when the bolt is in its forward position to engage said lever-bearing for opening the bolt, and having an arm constructed, when the actuator is retracted, to engage the actuator-locker catch, whereby on the retraction of the actuator and transverse opening movement of the bolt the actuator is locked in its retracted position.

8. In a bolt-gun, the combination with a receiver adapted to carry a sliding bolt and having a recoil-abutment, of a bolt fitted to slide in the receiver and adapted to have at one end thereof a transverse movement from and into engagement with the recoil-abutment, a bolt-actuator-locker substantially as described carried by the bolt and having an actuator-engaging catch, a bolt-actuator carried by the bolt and having an arm adapted, when the actuator is retracted, to engage the bolt-actuator-locker catch for locking the actuator in its retracted position, and an actuator-locker-retractor located in the gun to engage the actuator-locker for unlocking the actuator at the close of the forward movement of the bolt.

9. In a bolt-gun, the combination with a receiver adapted to carry a sliding bolt and having a recoil-abutment and a lever-bearing, of a bolt fitted to slide in the receiver and adapted to have at one end thereof a transverse movement from and into engagement with the recoil-abutment, an actuator-locker substantially as described carried by the bolt and having an actuator-engaging catch, a bolt-actuator carried by the bolt and having a lever adapted, when the bolt is in its forward position, to engage said lever-bearing for opening and closing the bolt, and having an arm constructed to engage, when the actuator is retracted, the actuator-locker catch, and a locker-actuator located to engage said actuator-locker after the actuator-lever-arm comes into engagement during the forward movement of the bolt with said lever-bearing, whereby the locked actuator is unlocked at the close of the forward movement of the bolt, for closing the bolt forward of the recoil-abutment.

10. In a bolt-gun, the combination with a receiver adapted to carry a sliding bolt and having a recoil-abutment and a lever-bearing, of a bolt fitted to slide in the receiver and adapted to have at one end thereof a transverse movement from and into engagement with the receiver recoil-abutment, and a shiftable bolt-locker carried by the bolt and adapted to engage the locker-abutment when the bolt is closed and having a lever-arm engaging the lever-abutment when the bolt is in its forward position, said lever operating on one shifting movement of the bolt-locker to simultaneously close the bolt forward of the recoil-abutment and carry the bolt-locker forward of said bolt-locker-engaging abutment.

11. In a bolt-gun, the combination with the receiver adapted for carrying a sliding-bolt, and having a vertically inclined recoil-abutment for the bolt, of the bolt constructed to slide longitudinally in said receiver, and having an inclined abutment to engage the inclined recoil-abutment of the receiver, and adapted to have, when in its closed position, transverse movements to bring the two abutments into sliding-engagement, and an oscillating bolt actuator, journaled in said bolt, adapted for transversely closing the bolt with its abutment into close engagement with the inclined abutment of the receiver whereby the bolt is driven slightly forward during said transverse closing movement for tightly impinging the rim of the cartridge between the end of the bolt and barrel of the gun.

12. In a bolt-gun, the combination with a receiver adapted to carry a sliding bolt and having a recoil-abutment, a locker-abutment, a lever-bearing, and a hook-catch, of a bolt fitted to slide in the receiver and adapted to have at one end thereof a transverse movement from and into engagement with the receiver recoil-abutment, and a shiftable bolt-locker carried by the bolt and adapted to engage the locker-abutment when the bolt is closed, and having a lever-arm engaging the lever-abutment when the bolt is in its forward position, and having a hook adapted to engage said hook-catch, said lever operating on one shifting movement of the bolt-locker to simultaneously close the bolt forward of the recoil-abutment, carry the bolt-locker forward of said bolt-locker-engaging abutment, and carry said bolt-locker-hook into engagement with the receiver-catch.

13. In a bolt-gun, the combination with a receiver adapted to carry a sliding bolt and having a recoil-abutment, of the bolt fitted to slide in the receiver and to have transverse movements for engaging and disengaging it with and from said recoil-abutment, a firing-pin substantially as described carried by the bolt and adapted to have longitudinal movements therein, a bolt-actuator movably supported on the bolt and engaging the receiver when the bolt is in its forward position, for imparting transverse opening and closing movements to the bolt, and a firing-pin stop carried by said actuator into the path of the firing-pin during the transverse opening movement of the bolt, whereby the firing of the gun is prevented when the bolt is not fully closed.

14. In a bolt-gun, the combination with a receiver adapted to carry a sliding bolt and having a recoil-abutment and a hook-engaging catch, of a bolt fitted to slide in the receiver and adapted to have transverse movements from and into engagement with the recoil abutment, a firing-pin substantially as described carried by the bolt and adapted to have longitudinal movements therein, and a hook movably supported on the bolt and adapted to engage said receiver-hook catch when the bolt is closed, and constructed to extend into the path of the firing-pin during the first retractive movement of the hook, whereby the firing of the gun is prevented when the hook is not fully engaged with said catch.

15. In a bolt-gun, the combination of the receiver adapted for carrying a sliding-bolt, and having a recoil abutment with the rearwardly-projecting hook-engaging-catch at one end, and an inclined recoil abutting-face 22, as described, a bolt fitted to slide in said receiver having a depending abutment 24, one face of which coincides with the inclined face of the receiver-abutment, said bolt being adapted to have a transverse movement at one end to bring the two abutments into engagement, and an oscillating bolt-locker journaled in and carried by said bolt and having a hook-shaped arm to engage the catch of the receiver abutment when the bolt is depressed and in its forward position to tightly impinge the receiver-abutment between the said hook-shaped arm and the bolt-abutment, to double lock the bolt against longitudinal and transverse movement.

16. In a bolt-gun, the combination with the receiver adapted for carrying a sliding and vertically-movable bolt, and having a bearing face, as described, at its forward end at one side of the bore of the gun-barrel, of a non-rotatable bolt capable of longitudinal and transverse vertical movement, fulcrumed at its extreme forward end against the bearing face of the receiver, and carrying a cartridge-shell extractor remote from said fulcrum-bearing, and means, as described, for imparting, first—a direct vertically-radial movement to said bolt and extractor to forcibly start the cartridge-shell, and second—a longitudinal sliding movement to completely withdraw the cartridge-shell from the gun-barrel and a bolt-actuator journaled in said bolt, and adapted for imparting transverse movements thereto, substantially as described.

17. In a bolt-gun, the combination with the receiver adapted for carrying a sliding and transversely-movable bolt and having a fulcrum-bearing face 109 at one side of the bore of the gun-barrel and having the inclined recoil-abutment 22, as described, of the vertically-movable sliding-bolt fitting said receiver and having the depending abutment to engage the recoil-abutment 22, and having the fulcrum-bearing face 108 at its extreme forward end in position to bear against the face 109 of the receiver when the bolt is closed, a cartridge-shell extractor carried by said bolt at a distance from the said fulcrum bearing faces and having a catch to engage the rim of the cartridge-shell, and a bolt-actuator movably engaging said bolt and receiver, to forcibly retract the extractor in a slightly radial plane to start the cartridge from the bore of the gun-barrel.

18. In a bolt-gun, the combination with the receiver adapted for carrying a sliding and transversely-movable bolt and having an actuator-guide 43, of the sliding transversely movable bolt carried in said receiver, and the oscillating bolt-actuator journaled in said bolt and having the lever-arm 42 adapted for engagement with the actuator-guide 43 to restrain the actuator from any forward shifting movement until the actuator shall have been unlocked and the bolt shall have reached its extreme forward position, and means, as described, for locking and unlocking said actuator and bolt into and from engagement, respectively, with the receiver.

19. In a bolt-gun, the combination with a receiver adapted to carry a sliding bolt and having a recoil-abutment, a bolt-actuator bearing, and a lever-bolt fulcrum-bearing, of a lever-bolt fitted to slide in the receiver and adapted to have at the rearward end thereof a transverse movement from and into engagement with the recoil-abutment, and having at the forward end thereof a fulcrum contiguous, when the bolt is in its forward position, to said fulcrum-bearing, and provided with a cartridge-extractor and an oscillating bolt-actuator journaled in the bolt and constructed, when the bolt is in its forward position, to engage said actuator-bearing, and adapted to impart, on the forward and backward turning movements thereof, transverse closing and opening movements, respectively, to the rearward end of the bolt, whereby the bolt, during its disengagement from the recoil-abutment, constitutes a lever for starting the cartridge.

20. In a bolt-gun, the combination with a receiver adapted to carry a sliding bolt and having a recoil-abutment and actuator-guides substantially as set forth, of a bolt fitted to slide in the receiver and adapted to have transverse movements from and into engagement with the recoil-abutment, an actuator-catch movably supported on the bolt, a bolt-actuator movably supported on the bolt and constructed to engage, when in its retracted position, said catch, and constructed to engage said actuator-guides during the latter period of the forward movement of the bolt, and means for disengaging said catch from the actuator after this engages said guides, whereby the bolt-actuator is held against movement relatively to the bolt after the disengagement of said catch during the continued forward stroke of the bolt.

21. In a bolt-gun having a receiver and a sliding bolt substantially as described, the combination with the bolt-actuator carried by the bolt and having a catch, of the firing-pin and its arm, and a sear arranged to engage said firing-pin-arm for holding the firing-pin retracted, and having a detent-notch, adapted to engage said actuator-catch when the bolt mechanism is in position for firing.

22. In a bolt-gun of the class specified, the combination with the receiver having the inclined recoil abutment and the cam-face 37, as described, and having the actuator-engaging-guide 43, of the longitudinally transversely movable bolt having the depending inclined abutment to engage the abutment of the receiver, and a bolt-actuator carried by the bolt and having the lever-arm 42 to engage the guide 43 of the receiver, and a depending hook to engage the said cam-face 37 when the bolt is in its forward position to lock said bolt against longitudinal and transverse movement.

23. In a bolt-gun, the combination of the receiver having the detent-stop 7 thereon, the sliding-bolt having the groove 8 in which said stop is seated, said groove and stop limiting the sliding movement of said bolt, a transversely-movable detent-pin carried by the bolt and adapted to extend into said groove and abut against the detent-stop, and means for holding said pin into, and releasing it from, engagement with the detent-stop, whereby the bolt-mechanism may be withdrawn upon the release of said pin.

24. In a bolt-gun, the combination with the receiver having a detent-catch, of the grooved bolt carrying the transversely-movable detent-pin, and a detent-pin-actuating slide, substantially such as described, carried by the bolt and constructed to actuate the detent-pin.

25. In a bolt-gun, the combination with the receiver having a detent-catch, and with a bolt, substantially as described, having the catch 17, of the transversely-movable detent-pin, and the detent-pin-actuating slide 13 having the spring-catch, engaging said catch 17 for holding said slide in place while this is in use.

26. In a bolt-gun, the combination with a receiver having the detent-catch 7 constructed with the inclined detent-face 114, and with the sliding bolt, of the detent-pin transversely movable in the bolt and having the inclined detent-face 115, and means substantially such as described for holding said detent-pin in place and releasing the same, whereby the detent-pin is retracted by the detent-catches on the backward movement of the bolt after the release of said pin.

27. In a bolt-gun of the class specified, and as a means for retaining the firing-pin in place within the bolt thereof, the combination with the bolt and with the firing-pin adapted to slide therein, of the bolt-actuator carried by a stem, journaled in said bolt transversely of the firing-pin and extending into the firing-pin bore, and the firing-spring carried on the firing-pin forward of said stem and reacting against said stem as set forth, whereby the bolt and firing-pin may be disassembled on the removal of the bolt-actuator.

28. In a gun, the combination with the receiver having a space for the bolt and constructed to carry the guard-block, of a guard-block substantially as described depending from the receiver and having the pivot-bearings 76 and 77, a magazine retaining-catch pivotally and removably supported in said pivot bearings, and a spring in engagement with said catch, to hold the same in place, substantially as described.

29. In a bolt-gun, having a receiver and a sliding-bolt substantially as described, the combination therewith of the bolt-actuator carried by the bolt and having a depending locking-arm, the lower end of which acts as a guiding abutment and catch for the firing-pin retracting-sear, the firing-pin having a depending arm adapted to extend below the lower face of the actuator-arm, a pivoted sear arranged to engage said firing-pin arm during the forward movement of the bolt to retract the firing-pin, and means to normally retain the firing-pin arm-engaging portion of the sear in the path of movement of and insure its engagement with said firing-pin arm, and a trigger to actuate said sear to release the firing-pin arm from engagement therewith.

30. In a gun of the class specified, and as a framework therefor, the combination with the receiver having in the under side thereof guard-block-receiving recesses 117 substantially as described, of the guard-block 59 adapted to carry the sear and trigger, and having catches at its upper end engaging the recesses in said receiver and means as described for securing the guide-block in locked engagement with the receiver, substantially as set forth.

31. In a bolt-gun, the combination with the receiver and with the sliding bolt contained therein substantially as described, of the actuator carried by said bolt having the depending arm 33 to engage the catch 35 upon the receiver to lock the bolt against transverse movement with relation to said receiver, a firing-pin carried within said bolt and having the depending arm 26 with the catch 27 at its lower end, the firing-pin retracting sear 39 pivoted in advance of the actuator-arm and having a rearwardly-extending arm to engage the catch 27 of the firing-pin-arm and having a catch 91 to engage the actuator-arm when the firing-pin is retracted, a removable magazine-catch 66 in advance of said sear, a spring interposed between, and engaging said sear and magazine catch to hold the magazine catch in place and retain the sear normally in position for, or in engagement with the firing-pin-arm 26, and a trigger to actuate said sear to release the firing-pin-arm, substantially as described.

32. In a bolt-gun of the class specified, the combination with the receiver B having the projection 7 on one side of the bolt-space and the groove 9 on the other side of said space, of the bolt E having near the forward end thereof a guide fitting in said groove, and having on its side opposite said guide a guide-groove for said projection 7 terminating at the rearward end thereof in the recess 23 for permitting the transverse movement of the rearward end of the bolt into locking engagement with the receiver, substantially as described.

33. In a bolt-gun, the combination with a receiver substantially as described having the guide-surface 41 and the lever-bearings 40 and 43, of the sliding and transversely-movable bolt, and the actuator F journaled in said bolt, and constructed when in its forward position to engage between said lever-bearings, and when in its retracted position relatively to the bolt to engage between said guide-bearing 41 and lever-bearing 43 during the later period of the forward movement of the bolt, whereby the bolt is actuated and guided.

34. In a bolt-gun, the combination of the receiver constructed to receive a sliding bolt, and having bolt-guides, the sliding bolt having guiding grooves in engagement with said guides and adapted to be guided in its longitudinal sliding movement in substantial alignment with the bore of the gun and adapted at its rearward end to have transverse movements from, and into locking engagement with the receiver, an oscillating bolt-actuator journaled in the bolt and carrying means for locking and unlocking the bolt with relation to the receiver and for imparting transverse movements to the rearward end thereof, and means for guiding said rearward end in its movement in lines substantially parallel with the forward end thereof during the longitudinal movement of the bolt, whereby the bolt travels during its longitudinal movement in a position inclined to its closed position, the bolt serving, during its transverse closing and opening movements, respectively, for driving home and starting the cartridge-shell.

35. In a bolt-gun, the combination with the receiver constructed to receive a sliding bolt and having bolt-guides therefor, as described, of the sliding bolt fitted to engage the receiver at its front end and be guided thereby in substantial alignment with the bore of the gun and adapted at its rear end to have transverse movement from and into locking-engagement with the receiver, an oscillating bolt-actuator journaled in the bolt and adapted for engagement with the receiver for locking and unlocking the bolt with relation to the receiver by imparting transverse movements to the rear end thereof, and means for guiding said rearward end to insure a movement, at the rearward end, in lines substantially parallel to the movement of the forward end thereof during the reciprocation of the bolt, whereby the bolt travels, during its longitudinal movement, in a position inclined to its closed position, the bolt serving, during its transverse closing and opening movement, respectively, for driving home and starting the cartridge-shell.

36. In a bolt-gun, the combination with a receiver constructed to receive a sliding and lifting bolt, and with the sliding and lifting bolt contained in said receiver as described, an oscillating bolt-actuator journaled in the bolt and imparting transverse movement thereto to start the cartridge-shell, a cartridge-shell extractor carried by said bolt, and means, substantially as described, to impart a lever-like reciprocation to said extractor, substantially as and for the purpose described.

37. In a bolt-gun, the combination with the receiver, of the lifting and sliding bolt having the recoil-abutment engaging the corresponding abutment of the receiver when the bolt is closed, and a swinging bolt-actuator journaled on the bolt and engaging the receiver for lifting the bolt, and engaging an abutment on the receiver when the bolt is closed, for reinforcing the lock of the bolt, substantially as described.

38. In a bolt-gun, the combination with the receiver having a fulcrum bearing 109 at one side of the bore of the gun and adapted for carrying a sliding and vertically-movable bolt, of the vertically movable sliding-bolt fitting said receiver and having a fulcrum-bearing at its forward end against the bearing 109 of the receiver, a bolt-actuator journaled in, and capable of imparting a vertical lever-like movement to the bolt with relation to the fulcrum 109 of the receiver the cartridge-shell extractor carried by said bolt at a distance from the said fulcrum-bearing and adapted to start the cartridge-shell upon the transverse movement of the bolt, a cam-projection 73 upon the extractor in vertical alignment with the axis of said bolt and in a plane of movement of the cartridge-shell, an ejector pivoted in the rear of, and in alignment with the cam-projection 73 and having a projection 71 to be engaged by the cam 73 on the retraction of the bolt to throw the forward end of the ejector upward to eject the shell, substantially as described.

39. In a bolt-gun, the combination with the receiver having the lever-bearings 40 and 43 and the guide-piece 41 and adapted for receiving a sliding and vertically-movable bolt, of a sliding-bolt contained within said receiver and capable of vertical movement, a bolt-locking actuator journaled in the bolt with its axis crosswise to the line of movement of the bolt and having the lever-arm 42 to engage the lever-bearing 43 of the receiver, a locking-catch upon the receiver, a locking-arm upon the actuator to engage the locking-catch upon the receiver to lock the bolt in its depressed or closed position with relation to the receiver, and a depending handle-arm upon the actuator extending below and movable relative to the bolt in the direction of the bolt movement, whereby the bolt locking actuator may be oscillated to impart a transverse movement to the bolt and lock the same in its depressed position with relation to the receiver, simultaneously, substantially as described.

40. In a bolt-gun, the combination with the receiver constructed to carry a sliding bolt and having recesses 48, 49 at its forward end below the bore of the gun-barrel, of a sliding-bolt fitting said receiver and having oppositely-disposed projections at its extreme forward end in alignment with, and capable of entering the recesses 48 and 49, when the bolt is closed, which projections support the cartridge-shell while being withdrawn from the barrel, substantially as described, and also act, during the forward movement of the bolt, to engage the rims of the cartridges as they are fed from the magazine and press said cartridges forward alternately into the gun-barrel.

JAMES P. LEE.

Witnesses:
FRANCIS H. RICHARDS,
HENRY L. RECKARD.